United States Patent
Kuo et al.

(10) Patent No.: US 11,237,610 B2
(45) Date of Patent: Feb. 1, 2022

(54) HANDLING LOSS OF POWER FOR UNINTERRUPTIBLE POWER SUPPLY EFFICIENCY

(71) Applicant: Intel Corporation, Santa Clara, CA (US)

(72) Inventors: Chia-Hung S. Kuo, Folsom, CA (US); Philip Lehwalder, Hillsboro, OR (US); Arik Gihon, Rishon LeZion (IL)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 16/689,644

(22) Filed: Nov. 20, 2019

(65) Prior Publication Data

US 2021/0149469 A1    May 20, 2021

(51) Int. Cl.
*G06F 1/30* (2006.01)
*H02J 9/06* (2006.01)

(52) U.S. Cl.
CPC ............... *G06F 1/30* (2013.01); *H02J 9/061* (2013.01)

(58) Field of Classification Search
CPC ............... G06F 1/30; H02J 9/061; H02J 9/06
See application file for complete search history.

(56) References Cited

U.S. PATENT DOCUMENTS

| | | | |
|---|---|---|---|
| 9,047,076 B1 * | 6/2015 | Lee | G06F 1/263 |
| 9,553,483 B2 * | 1/2017 | Wang | H02J 7/345 |
| 9,871,406 B1 * | 1/2018 | Churnock | H02J 3/0073 |
| 10,474,550 B2 * | 11/2019 | Subrahmanyam | G06F 12/0804 |
| 2005/0052805 A1 * | 3/2005 | Sato | H02J 9/06 713/340 |
| 2006/0026447 A1 * | 2/2006 | Naveh | G06F 1/3296 713/322 |
| 2008/0104436 A1 * | 5/2008 | Sawyers | G06F 1/3203 713/323 |
| 2012/0079321 A1 * | 3/2012 | Williams | G06F 11/2015 714/14 |
| 2012/0275081 A1 * | 11/2012 | Ahn | H01G 4/232 361/301.4 |
| 2013/0116946 A1 * | 5/2013 | Familiant | H02J 3/00 702/58 |
| 2014/0173305 A1 * | 6/2014 | Uan-Zo-Li | G06F 1/3212 713/320 |
| 2014/0181546 A1 * | 6/2014 | Hallberg | H02H 9/02 713/320 |
| 2014/0208129 A1 * | 7/2014 | Morales | H02J 9/02 713/300 |

(Continued)

FOREIGN PATENT DOCUMENTS

EP         3301526 A1 *  4/2018  ............ G06F 1/266

*Primary Examiner* — Aurel Prifti
(74) *Attorney, Agent, or Firm* — Schwabe, Williamson & Wyatt, P.C.

(57) ABSTRACT

Described are mechanisms and methods for reducing CPU power upon interruption of a supplied power. In some embodiments, an apparatus may comprise an input to receive an indicator that a supply voltage to a computer system has been interrupted. The apparatus may comprise an output to provide an indicator to reduce a processor power consumption level. The apparatus may also comprise a circuitry to establish the indicator to reduce the processor power level based upon the indicator that the supply voltage to the computer system has been interrupted.

19 Claims, 5 Drawing Sheets

(56) References Cited

U.S. PATENT DOCUMENTS

| | | | | |
|---|---|---|---|---|
| 2015/0180232 A1* | 6/2015 | Mino | ................... | H02J 1/102 |
| | | | | 307/23 |
| 2015/0355699 A1* | 12/2015 | Castro-Leon | ........... | G06F 1/324 |
| | | | | 713/322 |
| 2015/0380968 A1* | 12/2015 | Lee | ................... | G06F 1/30 |
| | | | | 713/300 |
| 2016/0181861 A1* | 6/2016 | Familiant | ................ | H02J 9/06 |
| | | | | 307/66 |
| 2017/0155276 A1* | 6/2017 | Harada | ................ | H02J 7/022 |
| 2017/0242467 A1* | 8/2017 | Kelly | ................ | G06F 11/0757 |
| 2017/0254852 A1* | 9/2017 | Gould | ................ | G01R 31/3275 |
| 2017/0364132 A1* | 12/2017 | Gendler | ................ | G06F 1/324 |
| 2018/0032390 A1* | 2/2018 | Rahmanian | ............... | G06F 1/30 |
| 2018/0113499 A1* | 4/2018 | Fernandes | ................ | G06F 1/30 |
| 2018/0241244 A1* | 8/2018 | Stevens | ............. | H01R 13/6675 |
| 2019/0235965 A1* | 8/2019 | Peng | ................ | G06F 11/1448 |
| 2019/0332154 A1* | 10/2019 | Thompson | ............... | G06F 1/24 |
| 2020/0125159 A1* | 4/2020 | Messick | ............... | G06F 1/3206 |
| 2020/0379535 A1* | 12/2020 | Goodson, II | .............. | G06F 1/30 |

\* cited by examiner

HANDLING LOSS OF POWER FOR UNINTERRUPTIBLE POWER SUPPLY EFFICIENCY

BACKGROUND

Computer systems often accept electric power transmitted and distributed to end-users such as residential customers or business customers. For practical reasons, such electric power is usually delivered in an Alternating Current (AC) form. An end-user may accordingly power a computer system by an AC power source like an electrical outlet.

Such transmission of power may occasionally be interrupted, such as during a power outage. When that happens, an Uninterruptible Power Supply (UPS) may provide a backup source of power.

Meanwhile, computer systems may incorporate persistent memory technologies that use Intel Optane™ as a persistent or non-volatile far memory. (Optane™ is a trademark of Intel Corporation of Santa Clara, Calif.) Systems including persistent memory may experience events in which a distributed power source is interrupted, and a UPS may subsequently provide an energy source to flush modified persistent memory contents in a volatile near memory to a far memory, thereby protecting data from loss.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Electric power that is transmitted & distributed to computer systems, such as Alternating Current (AC) power, may be interrupted. In such events, an Uninterruptible Power Supply (UPS) may act as a battery to prevent a sudden loss of power and to provide a backup source of power to keep a computer system powered up and operational to protect data from loss. Computer systems that utilize a UPS (e.g., an offline UPS, which may be external to the chassis of the system) or a platform battery may include client desktop systems, laptop systems, workstations, and servers.

For a computer system that utilizes a UPS, an AC power source may provide power to the UPS, and the UPS may provide power to a Power Supply Unit (PSU) of the computer system. The UPS itself may have a battery that the AC power source is also charging. In normal operation, a standby UPS may supply the AC power source to the PSU. (In comparison, a continuous UPS may supply power to the PSU from the battery, which may be continuously charging.) When a sudden power loss occurs, the standby UPS may transition to supplying power to the PSU from the battery.

Meanwhile, a computer system may also incorporate a "near memory" (e.g. Dynamic Random Access Memory (DRAM)) which may be closer to a Central Processor Unit (CPU) in the system's architecture and a "far memory" which may be further from the CPU. In some systems, the near memory may include a volatile memory, such as a DRAM. In some systems, the far memory may include a non-volatile memory, such as an Optane™ based memory Computer systems may use the near memory and far memory in implementing a persistent memory model. In such a model, the near memory may be cached by DRAM and data in the near memory may be marked "persistent." In addition, contents of near memory may become "dirty" (e.g., their values have changed relative to values stored in corresponding portions of far memory).

In the event of a loss of AC power, computer systems implementing a persistent memory model may be disposed to "flush" back to far memory—i.e., write back to far memory-any dirty near memory that has been marked persistent (in addition to CPU cache flushes). For example, upon loss of AC power, a system may be disposed to flushing portions of a near memory that have been marked persistent-such as contents of a DRAM cache or Double Data Rate (DDR) cache, which may have a relatively large capacity—to an Optane™ far memory. A persistent memory may incorporate a large volatile cache (e.g., a DDR cache) that is close to a processor to enhance performance.

Use of a UPS in computer systems that implement a persistent memory model may thereby protect the state and/or contents of CPU caches and near memory, because otherwise there may not be sufficient residual energy to complete the flush upon the loss of AC power. Some computing-system designs that support persistent memory may incorporate a UPS that is rated to support platform peak power (e.g., a peak amount of power supplied by the PSU to the computer system). For example, an example design that incorporates a 1000 Watt (W) rated PSU may incorporate a 1000 W rated UPS. A disadvantage of a "full size" UPS (e.g., a UPS rated to continuously supply a peak power per the full power rating of the PSU) is that it may add additional Bill-of-Materials (BOM) costs to Original Equipment Manufacturers (OEMs).

However, a UPS may be capable of being temporarily "overloaded" and supplying a greater amount of power than the amount for which it is nominally rated. Contemporary UPS designs may be capable of supporting 125% to 150% of rated continuous maximum power ($P_{MAX}$) for a window of time, which may be from 1 to 10 seconds. For example, in some designs, a UPS may be temporarily overloaded to up to 140% of continuous rated power. As a result, a lower continuous-power rated UPS may temporarily supply the power of a full size UPS.

Returning to the previous example design incorporating the 1000 W PSU, a UPS rated for continuous power of 715 W may be operable to temporarily supply 1000 W. Since a smaller-sized UPS (e.g., a UPS with a lower-rated continuous power) may be significantly less expensive than a full-size UPS, the use of a smaller-sized UPS may thus comparatively reduce BOM costs to OEMs (from approximately $7 for systems with 250 W PSUs to approximately $10 for systems with 1000 W PSUs).

Thus, in various embodiments disclosed herein, for computer systems implementing persistent memory, a UPS may have a lower power-supply rating than the power-supply rating of the PSU that it serves. Upon an AC power loss event, the UPS may temporarily supply power to the PSU in excess of its own power-supply rating, in order to match the power-supply rating of the PSU. Then, in response to the AC power loss event, the CPU's power consumption may be reduced (e.g., throttled). For example, the CPU may "fold back" or reduce its power consumption if its Power Level 4 (PL4) is lowered to a lower frequency. The throttling of the CPU's power may occur within the window of time in which the UPS is temporarily supplying power in excess of its power-supply rating.

Subsequently, at the end of the window of time, the throttling of the CPU's power may be complete, and the UPS may supply power in accordance with its power-supply rating, which may then be sufficient to meet the system's power consumption given the reduced power consumption of the throttled CPU. In some embodiments, the window of time may be at least as long as a single cycle of a supplied AC power. For AC power supplied at 60 hertz, the window of time may be at least 16.6 milliseconds (ms). For AC power supplied at 50 hertz, the window of time may be at least 20 ms.

During and/or after this window of time, the system may be adequately powered to flush back to far memory any dirty near memory that has been marked "persistent." The flush may advantageously be supported by a more efficient and more cost-effective UPS, which may provide sufficient power to the throttled CPU. After the flush, the computer system may then shut down. When AC power is subsequently restored to the system, the CPU may be expected to be stable, since the flush will have maintained the memory's persistence.

Since a smaller-sized UPS (e.g., a UPS having a lower continuous-power rating) may not supply the full power that the PSU can provide to the system for an indefinite amount of time, the load must fold back or be reduced within a finite amount of time. This in turn may be enabled by a combination of two things. First, a design may include a UPS that is operable to supply power in excess of its continuous-power rating for that specified amount of time following the AC loss event (e.g., until the power has folded back to running from an internal battery of a UPS). Second, the design may provide a method to lead power to dropping (e.g., folding back) below the UPS continuous power limit within a specified time following an AC loss event (e.g., at which voltage will transition from being supplied via AC to being supplied via a Direct Current (DC) output of a battery of the UPS).

Based on the above, an equation indicating an effective UPS power for a reduced-size UPS to support the mechanisms and methods discussed herein may be:

$$\text{effective } UPS \text{ power} = \frac{P_{platform\_max}}{1.4} + P_{dGFX\_max}$$

where: $P_{platform\_max}$ may be a maximum power consumption of the platform (e.g., a full power rating of a PSU); and $P_{dGFX\_max}$ may be a maximum power consumption of a high-power third-party graphics card. In the equation above, $P_{dGFX\_max}$ is included for the sake of completeness. However, note that in consumer systems where an integrated graphics is used, $P_{dGFX\_max}$ may be 0 Watts. Moreover, in some embodiments, $P_{platform\_max}$ may already encompass power consumption of a graphics card and/or other additional components.

Disclosed herein are mechanisms and methods for reducing CPU power upon interruption of a supplied power. This may advantageously facilitate the flushing of persistent memory from near-memory circuitries (or devices) to far-memory circuitries (or devices), while avoiding the use of a more-expensive full-size UPS to support persistent memory data durability. This may, in turn, advantageously save significant BOM costs (e.g., for OEMs).

In some embodiments, persistent memory might not be flushed from near-memory to far-memory. Such embodiments may still advantageously avoid the use of a more-expensive full-size UPS, which may in turn advantageously save significant BOM costs.

Figure 1:
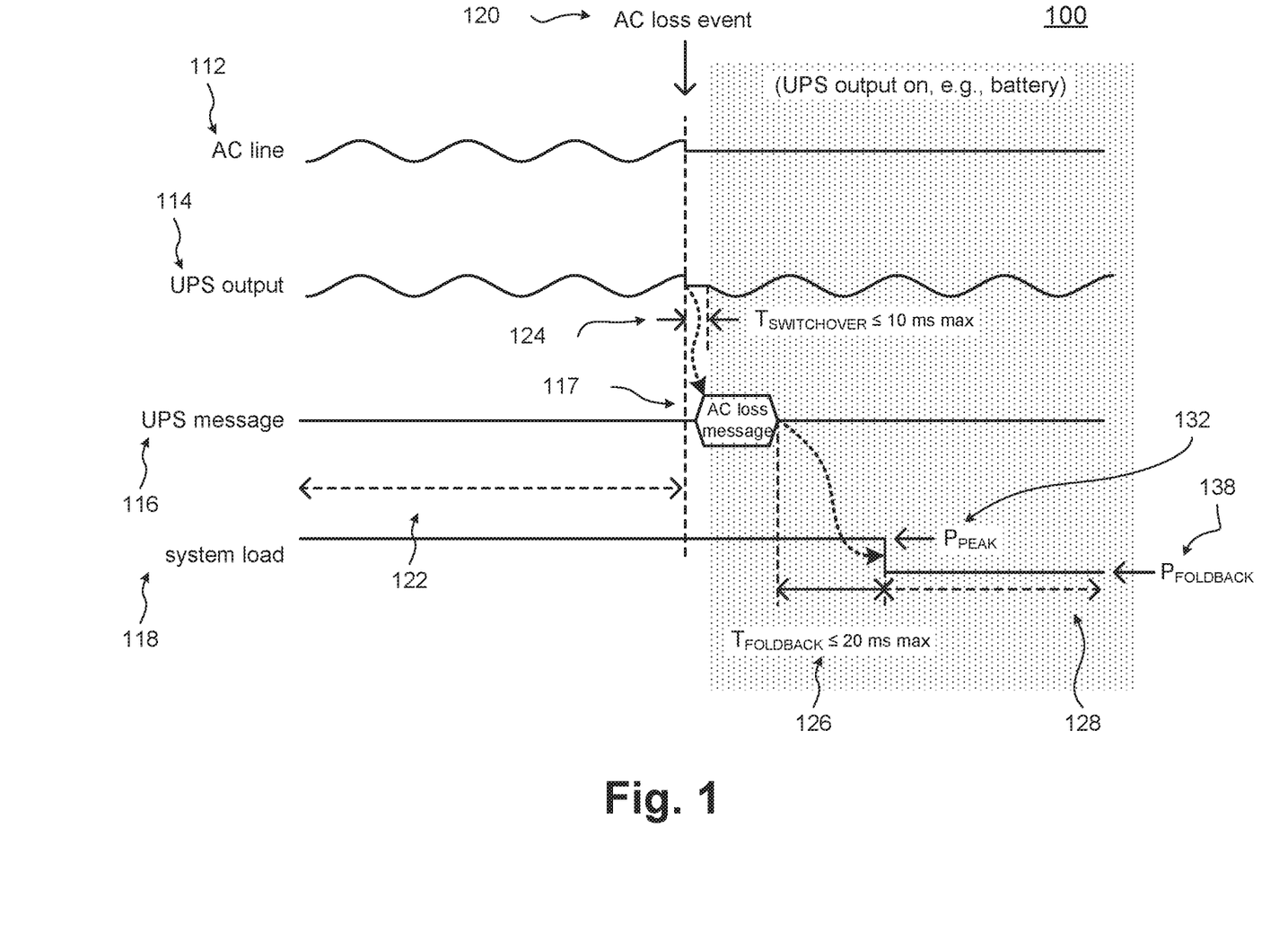
FIG. 1 illustrates a scenario of power loss notification, in accordance with some embodiments of the disclosure.

FIG. 1 illustrates a scenario of power loss notification, in accordance with some embodiments of the disclosure. A scenario 100, which depicts a flow of notification of AC loss to a UPS and subsequent switch-over from AC power, comprises an AC line state 112, a UPS output state 114, a power loss indicator 116, and a system load state 118.

In a preceding time 122 before an AC loss event 120, AC line state 112 may have an oscillating voltage (e.g., a sinusoidal voltage). The underlying AC line may be coupled to a UPS, which may have an output selected from either the AC line, or a battery charged by the AC line (e.g., in a standby UPS). Accordingly, in preceding time 122, the UPS may be selecting to pass the AC line state through to the UPS output (and UPS output state 114 may reflect AC line state 112). In that time-frame, system load state 118 may be, at a maximum, a $P_{PEAK}$ power consumption 132.

Upon the occurrence of AC loss event 120, the UPS may switch over to selecting to pass an oscillating voltage derived from its battery through to the UPS output. That process may complete after a $T_{SWITCHOVER}$ time 124, which may be less than or equal to 10 ms. Meanwhile, the interruption of AC power at AC loss event 120 may trigger the delivery of an AC loss message 117 on power loss indicator 116.

Following AC loss event 120 upon receipt of AC loss message 117, for example—a computer system may initiate a fold back process to throttle CPU power consumption (and, thus, power consumption of the computer system). Over a $T_{FOLDBACK}$ time 126, which may be less than or equal to 20 ms, a total load on the UPS may fold back (or be throttled) from $P_{PEAK}$ power consumption 132 to a $P_{FOLDBACK}$ power consumption 138.

Accordingly, in a following time 128 after $T_{FOLDBACK}$ time 126, the UPS may be selecting to pass an oscillating voltage derived from its battery through to the UPS output. In that time-frame, a power consumption of the computer system may be, at a maximum, $P_{FOLDBACK}$ power consumption 138.

In some embodiments, in preceding time 122, an allowable UPS output power might not be limited to the same maximum continuous power when on AC as when on DC (e.g., on a battery of the UPS). For example, when on AC, the output power may merely be limited by wires from an AC input to an output outlet. In some embodiments, in following time 128, $P_{FOLDBACK}$ power consumption 138 may be less than or equal to a maximum allowable continuous power when on battery. For some embodiments, a PSU supplying the system load may be operable to sustain its output in regulation even with a loss of one full cycle of AC power, e.g., for at least 20 ms to support 50 hertz AC. (Although FIG. 1 depicts AC line state 112 and UPS output state 114 alternating at 50 hertz, in some embodiments, AC line state 112 and/or UPS output state 114 may alternate at another frequency.)

Off-the-shelf UPS devices may be capable of being hosted via a Universal Serial Bus (USB) connection to a computer system, and may support a Human Interface Device (HID) interface and driver in an operating system environment. In some embodiments, the AC loss message may be a USB message (such as a USB message related to the UPS as an HID). Accordingly, using a USB-based UPS as an example, detection of an AC power loss event may be communicated to a computer system via an inbox HID miniport driver.

In some embodiments, a software mechanism may inform a power agent of the computer system (e.g., a power controller or P-unit, which may be run by a pCode firmware) to lower processor frequencies and/or core frequencies upon an AC loss event. An example software flow to initiate CPU throttling may be described as follows:

```
if full capacity UPS (!= undersized)
{
    do nothing
}
else
{
    if AC loss
    {
        throttle CPU power
    }
}
```

When the AC loss indication is sent to the power agent, it may lower a PL4. In addition, in some embodiments, a warning message may be displayed to inform a user of the AC loss.

Off-the-shelf USB-based UPS devices may be compliant with USB HID specifications, and may accordingly support various sorts of communications to an operating system (OS), e.g., via USB HID messaging. Such messaging may include an "AC present" indicator, a "battery present" indicator, a "battery charging" and/or "battery discharging" indicator, a "battery full charge capacity" and/or "battery remaining capacity" indicator, and/or a "shutdown imminent" indicator.

Figure 2:
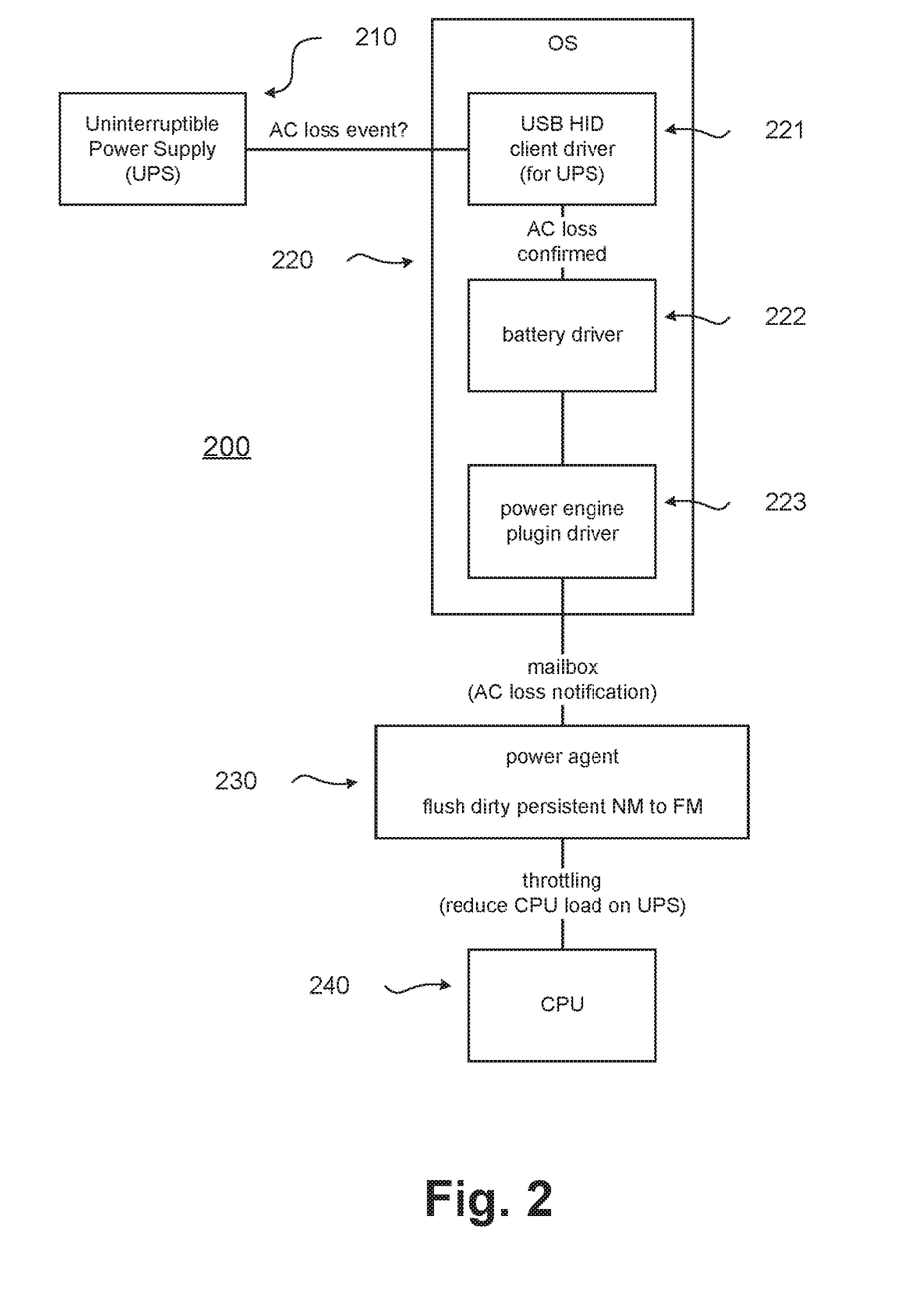
FIG. 2 illustrates a flow diagram for power loss detection and subsequent processor throttling, in accordance with some embodiments of the disclosure.

FIG. 2 illustrates a flow diagram for power loss detection and subsequent processor throttling, in accordance with some embodiments of the disclosure. A flow 200 may comprise a UPS part 210, an OS part 220, a power agent part 230, and a CPU part 240.

In UPS part 210, a UPS for a computer system may detect an AC loss event. In OS part 220, the UPS may communicate the AC loss event to an OS of the computer system. For example, in a first OS part 221, a USB HID message indicating an AC loss event may be communicated to a client driver of the OS. In a second OS part 222, the client driver may confirm the AC loss event for a battery driver of the OS. Then, in a third OS part 223, the battery driver may in turn communicate the AC loss event to a power engine plugin driver of the OS.

In power agent part 230, the OS may communicate the AC loss event to a power agent 230 of the computer system (e.g., a power controller or P-unit), which may then initiate a flush of dirty, persistent near-memory content to farm memory. In CPU part 240, the power agent may throttle a processor power (such as by throttling a processor frequency), thereby reducing a CPU load on the UPS.

Figure 3:
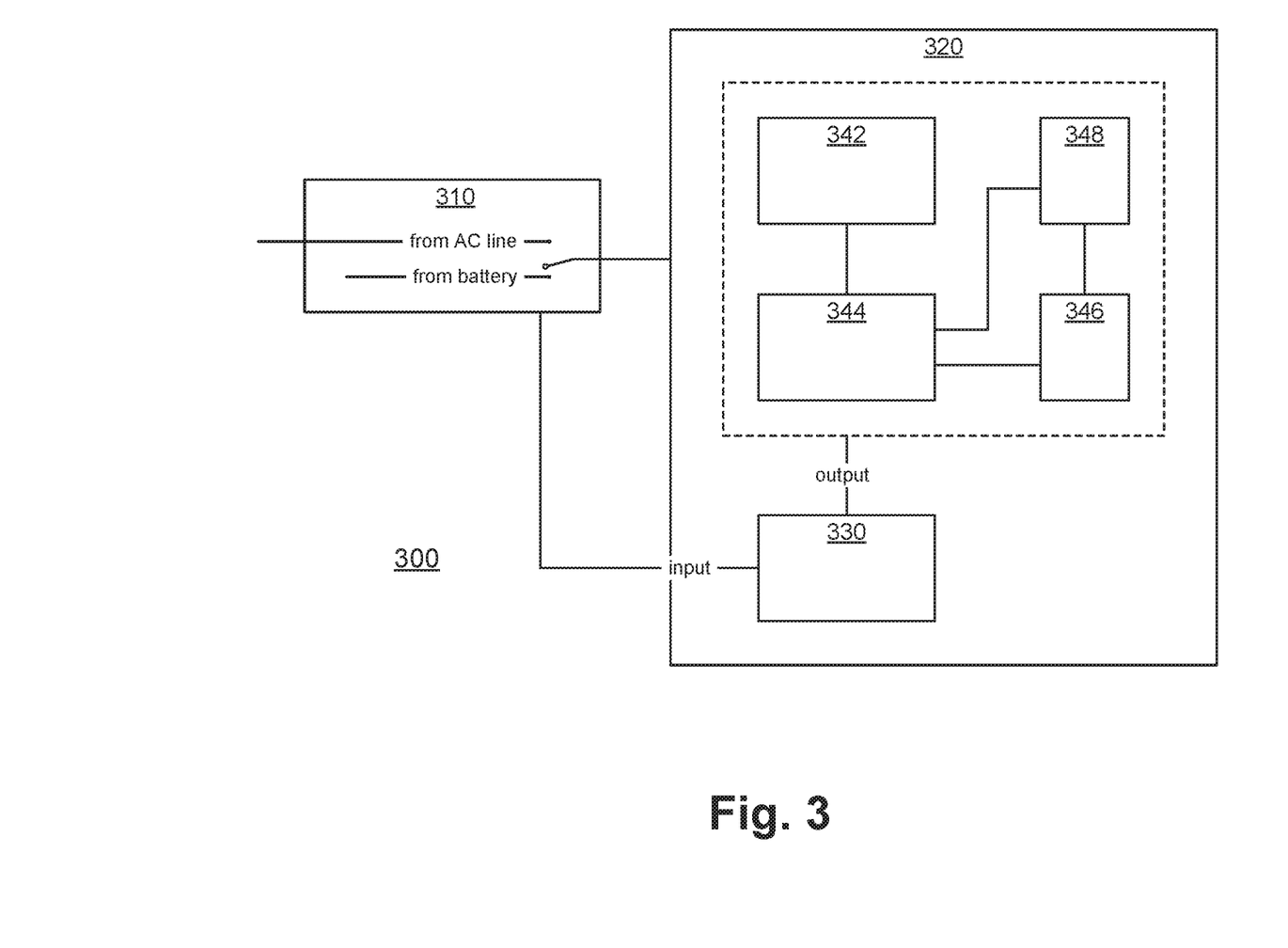
FIG. 3 illustrates mechanisms for reducing processor power upon notification of a power loss, in accordance with some embodiments of the disclosure.

FIG. 3 illustrates mechanisms for reducing processor power upon notification of a power loss, in accordance with some embodiments of the disclosure. A design 300 may comprise a UPS 310 and a computer system 320. Although UPS 310 is depicted as being external to computer system 320, in some embodiments, it may be located within computer system 320.

Computer system 320 may comprise an AC loss handling circuitry 330, one or more voltage regulator devices 342, one or more processors 344, one or more near-memory circuitries 346, and one or more far-memory circuitries 348. AC loss handling circuitry 330 may have an input to receive an indicator of power loss (e.g., a USB interface) and an output to provide an indicator to reduce a processor power consumption level. In some embodiments, AC loss handling circuitry may be part of a P-unit or power controller. For some embodiments, signaling may be received from UPS 310 on an interface and processed to generate the input to AC loss handling circuitry 330.

Regulator devices 342 may include a PSU. In some embodiments, regulator devices 342 may include a voltage regulator module (e.g., on a motherboard, or within the same package or die as a processor). In some embodiments, AC loss handling circuitry 330 may indicate the reduction of processor power consumption level to regulator devices 342. In some embodiments, AC loss handling circuitry 330 may indicate the reduction of processor power consumption level to processors 344.

Processors 344 may comprise a memory controller circuitry, which may interface with the near-memory circuitries 346 and/or far-memory circuitries 348. In some embodiments, the memory controller circuitry may be integrated at the package level or die level with processors 344, while in other embodiments the memory controller circuitry may be integrated with processors 344 outside the package level or die level. In some embodiments, a near-memory circuitries 346 may be coupled to and in communication with far-memory circuitries 348.

In some embodiments, the indicator that the supply voltage has been interrupted may accompany or lead to an assertion of an indicator that dirty near memory contents that have been marked "persistent" (e.g., contents of near-memory circuitries 346) is to be flushed to far memory (i.e., far-memory circuitries 348). In other embodiments, flushing of near memory contents to far memory might not occur.

Accordingly, in various embodiments, a computer system (such as computer system 300) may include an apparatus (such as AC loss handling circuitry 330) that has an input to receive an indicator that a supply voltage to the system has been interrupted, and an output to provide an indicator to reduce a processor power consumption level. The apparatus may also have a circuitry to establish the indicator to reduce the processor power level based upon the indicator that the supply voltage to the system has been interrupted.

In various embodiments, the indicator that a supply voltage to the system has been interrupted may include an AC loss message. For some embodiments, the supply voltage may be an AC voltage. In some embodiments, the indicator that the supply voltage to the system has been interrupted may include an indicator that the supply voltage has fallen to a no-voltage level.

For some embodiments, the indicator to reduce the processor power consumption level may include an indicator to throttle a processor frequency. In some embodiments, the indicator to reduce the processor power consumption level may include an indicator to flush at least a portion of the contents of a first memory to a second memory. In various embodiments, the first memory may include a near memory (e.g., a DRAM or DDR cache device), the second memory may include a far memory (e.g., an Optane™ memory device), and either or both may include a persistent memory.

In some embodiments, the supply voltage may correspond with a power of a first magnitude (e.g., an AC voltage corresponding with a power of a first magnitude, such as a root-mean-square (RMS) magnitude). A UPS may supply a voltage that has a power of the first magnitude (e.g., a magnitude of $P_{PEAK}$ power consumption 132) to the system for a predetermined length of time subsequent to the indicator that the supply voltage to the system has been interrupted, and the UPS may supply a voltage that has a power of a second magnitude (e.g., a magnitude of $P_{FOLDBACK}$ power consumption 138) to the system subsequent to the predetermined length of time, the first magnitude being greater than the second magnitude.

In some embodiments, the first magnitude may be at least forty percent greater than the second magnitude. For some embodiments, the predetermined length of time may be less than or equal to 20 milliseconds.

Alternatively, in various embodiments, a computer system (such as computer system 300) may include an apparatus (such as AC loss handling circuitry 330) that has an input to receive a first indicator that an AC voltage supplied to a system has stopped, and an output to provide a second indicator to flush at least a portion of the contents of a first memory to a second memory. The apparatus may also have a circuitry to establish the second indicator based upon the first indicator.

In some embodiments, the first indicator may include an AC loss message (e.g., based on an AC loss detection event that has been notified via USB to a UPS). For some embodiments, the second indicator may include at least one of: an indicator to reduce a processor power consumption level, or an indicator to throttle a processor frequency.

In various embodiments, the first memory may include a near memory (e.g., a DRAM or DDR cache device), the second memory may include a far memory (e.g., an Optane™ memory device), and either or both may include a persistent memory.

In some embodiments, the AC voltage supplied to the system may correspond with a power of a first magnitude (such as an RMS magnitude). A UPS may supply a voltage that has a power of the first magnitude to the system for a predetermined length of time subsequent to the indicator that the supply voltage to the system has been interrupted, and the UPS may supply a voltage that has a power of a second magnitude to the system subsequent to the predetermined length of time, the first magnitude being greater than the second magnitude.

In some embodiments, the first magnitude may be at least forty percent greater than the second magnitude. For some embodiments, the predetermined length of time may be less than or equal to 20 milliseconds.

Figure 4:
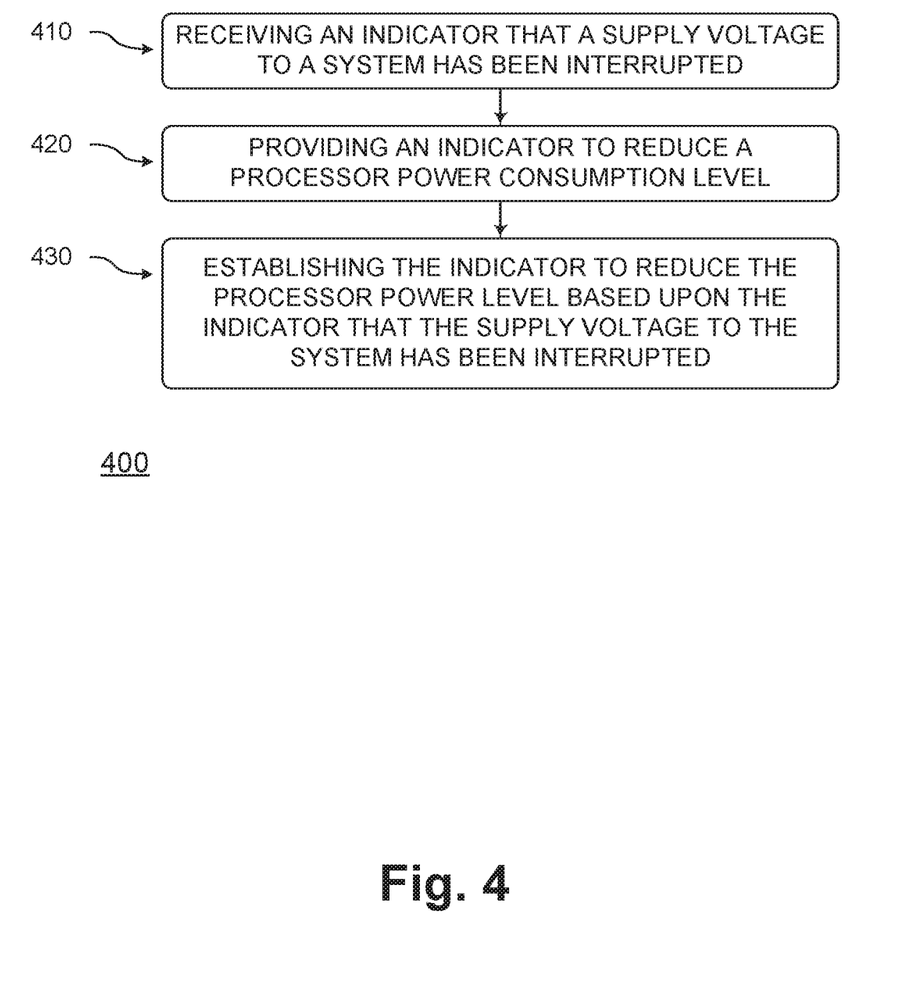
FIG. 4 illustrates methods for reducing processor power upon notification of a power loss, in accordance with some embodiments of the disclosure.

FIG. 4 illustrates methods for reducing processor power upon notification of a power loss, in accordance with some embodiments of the disclosure. A method 400 may comprise a receiving 410, a providing 420, and an establishing 430. In receiving 410, an indicator that a supply voltage to a computer system has been interrupted may be received. In providing 420, an indicator to reduce a processor power consumption level may be provided (e.g., to one or more voltage regulators and/or one or more processors). In establishing 430, the indicator to reduce the processor power level may be established based upon the indicator that the supply voltage to the computer system has been interrupted.

In some embodiments, the supply voltage may be an AC voltage. The indicator that the supply voltage to the computer system has been interrupted may include an AC loss message, and the indicator that the supply voltage to the computer system has been interrupted may include an indicator that the supply voltage has fallen to a no-voltage level.

For some embodiments, the indicator to reduce the processor power consumption level may include an indicator to throttle a processor frequency. In some embodiments, the indicator to reduce the processor power consumption level may include an indicator to flush at least a portion of the contents of a first memory to a second memory. The first memory may include a near memory (e.g., a DRAM or DDR cache device), the second memory may include a far memory (e.g., an Optane™ memory device), and either or both may include a persistent memory.

In some embodiments, the supply voltage may correspond with a power of a first magnitude. A UPS may be operable to supply a voltage that has a power of the first magnitude to the computer system for a predetermined length of time subsequent to the indicator that the supply voltage to the computer system has been interrupted, and the UPS may be operable to supply a voltage that has a power of a second magnitude to the computer system subsequent to the predetermined length of time, the first magnitude being greater than the second magnitude. For some embodiments, the first magnitude may be at least forty percent greater than the second magnitude. In some embodiments, the predetermined length of time may be less than or equal to 20 milliseconds.

Although the actions in the flowchart with reference to FIG. 4 are shown in a particular order, the order of the actions can be modified. Thus, the illustrated embodiments can be performed in a different order, and some actions may be performed in parallel. Some of the actions and/or operations listed in FIG. 4 are optional in accordance with certain embodiments. The numbering of the actions presented is for the sake of clarity and is not intended to prescribe an order of operations in which the various actions must occur. Additionally, operations from the various flows may be utilized in a variety of combinations.

In some embodiments, an apparatus may comprise means for performing various actions and/or operations of the methods of FIG. 4.

Moreover, in some embodiments, machine readable storage media may have executable instructions that, when executed, cause one or more processors to perform an operation comprising a method of FIG. 4. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 5:
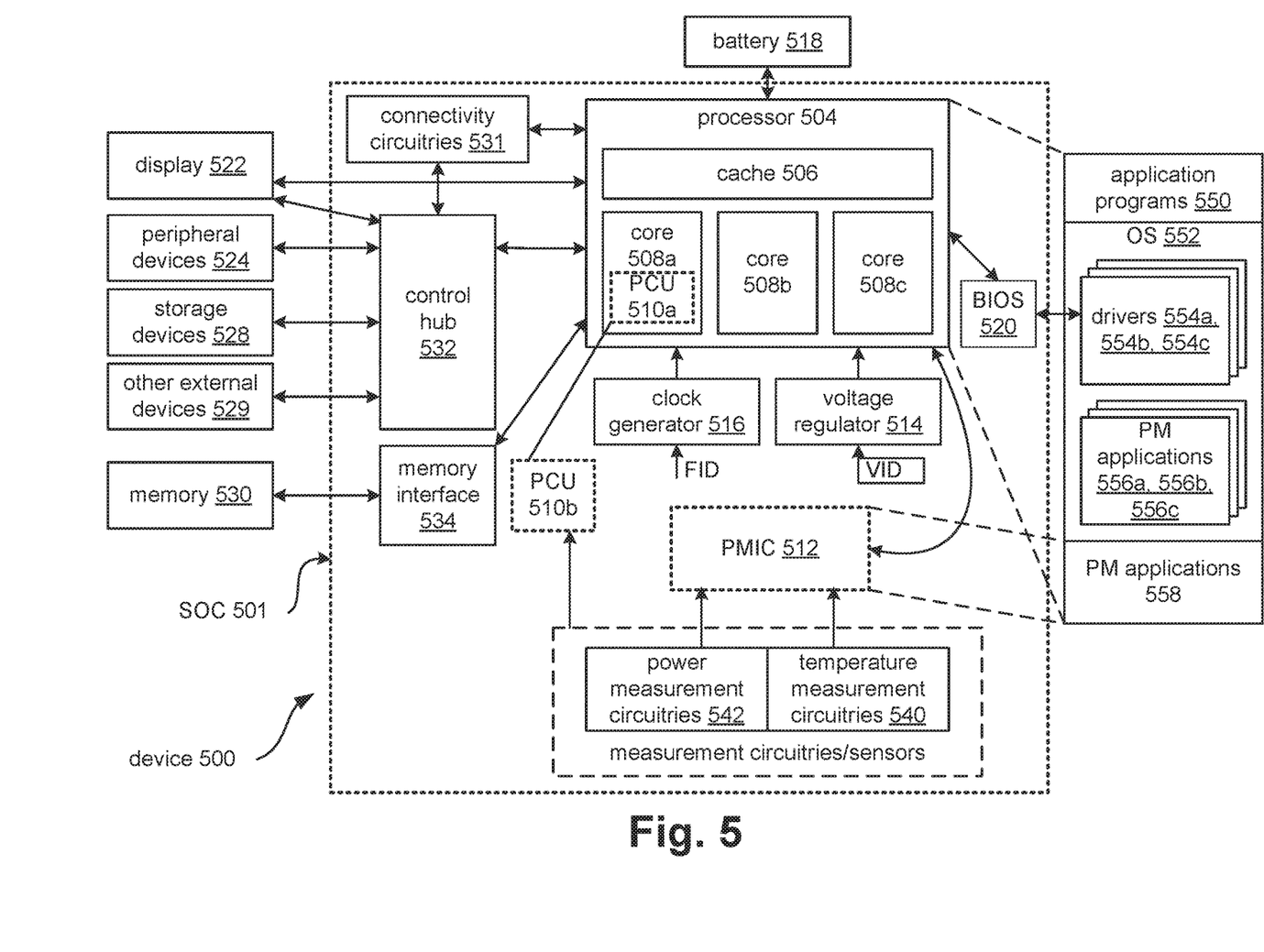
FIG. 5 illustrates a computer system or computing device with mechanisms for reducing processor power upon notification of a power loss, in accordance with some embodiments.

FIG. 5 illustrates a computer system or computing device with mechanisms for reducing processor power upon notification of a power loss, in accordance with some embodiments. It is pointed out that those elements of FIG. 5 having the same reference numbers (or names) as the elements of any other figure may operate or function in any manner similar to that described, but are not limited to such.

In some embodiments, a device 500 may comprise an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 500. In various embodiments, device 500 may include a computer system 320.

In some embodiments, device 500 may comprise a System-on-Chip (SoC) 501. An example boundary of SoC 501 is depicted using dotted lines in FIG. 5, with some example components depicted as being included within SoC 501. However, SoC 501 may include any appropriate components of device 500.

In some embodiments, device 500 may comprise a processor 504. Processor 504 may include one or more physical devices, such as microprocessors, application processors, microcontrollers, programmable logic devices, processing cores, or other processing means. The processing operations performed by processor 504 may include the execution of an operating system or an operating platform on which applications and/or device functions are, in turn, executed. The processing operations may include operations related to I/O (input/output) either with a human user or with other devices, operations related to power management, operations related to connecting computing device 500 to another device, and/or the like. The processing operations may also include operations related to audio I/O and/or display I/O.

In some embodiments, processor 504 may comprise multiple processing cores 508a, 508b, and 508c (also referred to as cores). Although three cores 508a, 508b, and 508c are depicted in FIG. 5, processor 504 may include any appropriate number of cores, e.g., tens of cores or even hundreds of cores. Cores 508a, 508b, and/or 508c may be implemented on a single integrated circuit (IC) chip. Moreover, the chip may include one or more shared and/or private caches, buses or interconnections, graphics and/or memory controllers, and/or other components. In various embodiments, processor 504 may comprise one or more processors 344.

In some embodiments, processor 504 may comprise a cache 506. In some embodiments, sections of cache 506 may be dedicated to individual cores (e.g., a first section of cache 506 may be dedicated to core 508a, a second section of cache 506 may be dedicated to core 508b, and so on). For some embodiments, one or more sections of cache 506 may be shared among two or more of the cores. Cache 506 may be split into different levels, e.g., a level 1 (L1) cache, a level 2 (L2) cache, a level 3 (L3) cache, and so on.

In some embodiments, cores 508a, 508b, and/or 508c may include a fetch unit to fetch instructions (including instructions with conditional branches) for execution by the core. The instructions may be fetched from a memory 530 (which may comprise any of a variety of storage devices). Cores 508a, 508b, and/or 508c may also include a decode unit to decode the fetched instruction. For some embodiments, the decode unit may decode fetched instruction into a plurality of micro-operations. Cores 508a, 508b, and/or 508c may also include a schedule unit to perform various operations associated with storing decoded instructions. In some embodiments, the schedule unit may hold data from the decode unit until the instructions are ready for dispatch, e.g., until all source values of a decoded instruction become available. For some embodiments, the schedule unit may schedule and/or issue (or dispatch) decoded instructions to an execution unit for execution.

The execution unit may execute dispatched instructions after they are decoded (e.g., by the decode unit) and dispatched (e.g., by the schedule unit). In some embodiments, the execution unit may include more than one type of execution unit (such as an imaging computational unit, a graphics computational unit, a general-purpose computational unit, and so on). The execution unit may also perform various arithmetic operations such as addition, subtraction, multiplication, and/or division, and may include one or more arithmetic logic units (ALUs). For some embodiments, a co-processor (not shown) may perform various arithmetic operations in conjunction with the execution unit.

Furthermore, the execution unit may execute instructions out-of-order. Accordingly, in some embodiments, cores 508a, 508b, and/or 508c may comprise an out-of-order processor core. Cores 508a, 508b, and/or 508c may also include a retirement unit. The retirement unit may retire executed instructions after they are committed. For some embodiments, retirement of the executed instructions may result in processor state being committed from the execution of the instructions, physical registers used by the instructions being de-allocated, and so on. Cores 508a, 508b, and/or 508c may also include a bus unit to enable communication between components of the core and other components via one or more buses. Cores 508a, 508b, and/or 508c may additionally include one or more registers to store data accessed by various components of the core (such as values related to assigned app priorities and/or sub-system states (modes) association.

In some embodiments, device 500 may comprise one or more connectivity circuitries 531, which may include hardware devices (e.g., wireless and/or wired connectors and communication hardware) and/or software components (e.g., drivers, protocol stacks, and so on) to enable device 500 to communicate with external devices. Device 500 may be separate from the external devices, such as other computing devices, wireless access points or base stations, and so on.

In some embodiments, connectivity circuitries 531 may include circuitries directed toward multiple different types of connectivity (e.g., connectivity protocols). To generalize, connectivity circuitries 531 may include cellular connectivity circuitries, wireless connectivity circuitries, and so on. Cellular connectivity circuitries of connectivity circuitries 531 may refer generally to cellular network connectivity provided by wireless carriers, such as via GSM (global system for mobile communications) or variations or derivatives thereof, via CDMA (code division multiple access) or variations or derivatives thereof, via TDM (time division multiplexing) or variations or derivatives thereof, via 3rd Generation Partnership Project (3GPP) Universal Mobile Telecommunications Systems (UMTS) system or variations or derivatives thereof, via 3GPP Long-Term Evolution (LTE) system or variations or derivatives thereof, via 3GPP LTE-Advanced (LTE-A) system or variations or derivatives thereof, via Fifth Generation (5G) wireless system or variations or derivatives thereof, via 5G mobile networks system or variations or derivatives thereof, via 5G New Radio (NR) system or variations or derivatives thereof, or via other cellular service standards.

Wireless connectivity circuitries (or wireless interfaces) of connectivity circuitries 531 may refer generally to wireless connectivity that is not cellular, and may include personal area networks (such as Bluetooth, Near Field, and so on), local area networks (such as Wi-Fi), wide area networks (such as WiMax), and/or other wireless communication. For some embodiments, connectivity circuitries 531 may include a network interface, such as a wired or wireless interface, so that a system embodiment may be incorporated into a wireless device (for example, into a cell phone or a personal digital assistant).

In some embodiments, device 500 may comprise a control hub 532, which may represent hardware devices and/or software components related to interaction with one or more I/O devices. Control hub 532 may be a chipset, a Platform Control Hub (PCH), and/or the like. Via control hub 532, processor 504 may communicate with a display 522 (or one or more displays), one or more peripheral devices 524, one or more storage devices 528, one or more other external devices 529, and so on.

Control hub 532 may provide one or more connection points for additional devices that connect to device 500, through which a user might interact with the system. In some embodiments, devices that can be attached to device 500 (e.g., external devices 529) may include microphone devices, speaker or stereo systems, audio devices, video systems or other display devices, keyboard or keypad devices, and/or other I/O devices for use with specific applications such as card readers or other devices.

As mentioned above, control hub 532 can interact with audio devices, display 522, and so on. In some embodiments, input through a microphone or other audio device may provide input or commands for one or more applications or functions of device 500. Additionally, audio output may be provided instead of, or in addition to display output. For some embodiments, if display 522 includes a touch screen, display 522 may also act as an input device, which may be at least partially managed by control hub 532. There may also be additional buttons or switches on computing device 500 to provide I/O functions managed by control hub 532. In some embodiments, control hub 532 may manage devices such as accelerometers, cameras, light sensors or other environmental sensors, or other hardware that can be included in device 500. The input may be part of direct user interaction, and may also provide environmental input to the system to influence its operations (such as filtering for noise, adjusting displays for brightness detection, applying a flash for a camera, or other features).

In some embodiments, control hub 532 may couple to various devices using any appropriate communication protocol, e.g., PCIe (Peripheral Component Interconnect Express), USB (Universal Serial Bus), Thunderbolt, High Definition Multimedia Interface (HDMI), Firewire, and so on.

In some embodiments, display 522 may represent hardware components (e.g., display devices) and software components (e.g., drivers) that provide a visual and/or tactile display for a user to interact with device 500. Display 522 may include a display interface, a display screen, and/or hardware device used to provide a display to a user. In some embodiments, display 522 may include a touch screen (or touch pad) device that provides both output and input to a user. In some embodiments, display 522 may communicate directly with processor 504. Display 522 may be an internal display device (e.g., as in a mobile electronic device or a laptop device) or an external display device attached via a display interface (e.g., DisplayPort, and so on). For some embodiments, display 522 may be a head mounted display (HMD) such as a stereoscopic display device for use in virtual reality (VR) applications or augmented reality (AR) applications.

In some embodiments, in addition to (or instead of) processor 504, device 500 may include a Graphics Processing Unit (GPU) (not depicted in the figure). The GPU may comprise one or more graphics processing cores, which may control one or more aspects of displaying contents on display 522.

For some embodiments, control hub 532 may include hardware interfaces and connectors, as well as software components (e.g., drivers, protocol stacks, and so on) to make peripheral connections, e.g., to peripheral devices 524.

It will be understood that device 500 could both be a peripheral device to other computing devices, as well as have peripheral devices connected to it. Device 500 may have a "docking" connector to connect to other computing devices for purposes such as managing content (e.g., downloading and/or uploading, changing, and/or synchronizing content) on device 500. Additionally, a docking connector may allow device 500 to connect to certain peripherals that allow computing device 500 to control content output (e.g., to audiovisual systems and/or other systems).

In addition to a proprietary docking connector or other proprietary connection hardware, device 500 may make peripheral connections via common or standards-based connectors. Such connectors may include a Universal Serial Bus (USB) connector (which may include any of a number of different hardware interfaces), a DisplayPort connector or MiniDisplayPort (MDP) connector, a High Definition Multimedia Interface (HDMI) connector, a Firewire connector, or other types of connectors.

In some embodiments, connectivity circuitries 531 may be coupled to control hub 532, e.g., in addition to, or instead of, being coupled directly to processor 504. In some embodiments, display 522 may be coupled to control hub 532, e.g., in addition to, or instead of, being coupled directly to processor 504.

In some embodiments, device 500 may comprise memory 530, which may be coupled to processor 504 via a memory interface 534. Memory 530 may include memory devices for storing information in device 500. Memory devices may include nonvolatile memory devices (for which state might not change if power to the memory device is interrupted) and/or volatile memory devices (for which state may be indeterminate, or lost, if power to the memory device is interrupted). Memory 530 may comprise a dynamic random access memory (DRAM) device, a static random access memory (SRAM) device, a flash memory device, a phase-change memory device, or another memory device (e.g., a memory device having performance suitable for serving as process memory). In some embodiments, memory 530 may operate as system memory for device 500, to store data and instructions for use when the one or more processors (e.g., processor 504) executes an application or process. Memory 530 may store application data, user data, music, photos, documents, or other data, as well as system data (whether long-term or temporary) related to the execution of the applications and functions of device 500.

Elements of various embodiments and examples may also be provided as a machine-readable medium (e.g., memory 530) for storing the computer-executable instructions (e.g., instructions to implement any other processes discussed herein). The machine-readable medium (e.g., memory 530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. Some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection). In various embodiments, cache 506 and/or memory 530 may comprise one or more near-memory circuitries 346 and/or one or more far-memory circuitries 348.

In some embodiments, one or more measurement circuitries and/or sensors of device 500 may comprise temperature measurement circuitries 540, e.g., for measuring temperature of various components of device 500. In some embodiments, temperature measurement circuitries 540 may be embedded, or coupled or attached to various components, whose temperature are to be measured and monitored. For some embodiments, temperature measurement circuitries 540 may measure temperatures of (or within) one or more of cores 508*a*, 508*b*, 508*c*, a voltage regulator 514, memory 530, a mother-board of SoC 501, and/or any other appropriate component of device 500.

In some embodiments, the measurement circuitries and/or sensors of device 500 may comprise one or more power measurement circuitries 542, e.g., for measuring power consumed by one or more components of the device 500. For some embodiments, power measurement circuitries 542 may measure power, voltage, and/or current. In some embodiments, power measurement circuitries 542 may be embedded, coupled, or attached to various components whose power, voltage, and/or current consumption are to be measured and monitored. For some embodiments, power measurement circuitries 542 may measure: power, voltage, and/or current supplied by voltage regulator 514 (which may comprise one or more voltage regulator); power supplied to SoC 501; power supplied to device 500; power consumed by processor 504 (or any other component) of device 500; and so on.

In some embodiments, device 500 may comprise one or more voltage regulator circuitries in voltage regulator 514. Voltage regulator 514 may generate signals at appropriate voltage levels, which may be supplied to operate any appropriate components of the device 500. As an example, voltage regulator 514 is depicted as supplying one or more signals (e.g., voltage signals) to processor 504 of device 500. In some embodiments, voltage regulator 514 may receive one or more Voltage Identification (VID) signals, and generates the voltage signals (e.g., to processor 504) at appropriate levels, based on the VID signals. Various type of VRs may be utilized for voltage regulator 514. In some embodiments, voltage regulator 514 may include a "buck" voltage regulator, a "boost" voltage regulator, a combination of buck and boost voltage regulators, low dropout (LDO) regulators, switching DC-DC regulators, and so on. Buck voltage regulators may be used in power delivery applications in which an input voltage is transformed to an output voltage in a ratio that is smaller than unity. Boost voltage regulators may be used in power delivery applications in which an input voltage is transformed to an output voltage in a ratio that is larger than unity. In some embodiments, each processor core may have its own voltage regulator, which may be controlled by a Power Control Unit (PCU) 510*a*, a PCU 510*b*, and/or a Power Management Integrated Circuit (PMIC) 512. In some embodiments, each core may have a network of distributed LDOs to provide efficient control for power management. The LDOs may be digital, analog, or a combination of digital or analog LDOs.

In some embodiments, device 500 may comprise one or more clock generator circuitries in a clock generator 516. Clock generator 516 generates clock signals at appropriate frequency levels, which may be supplied to any appropriate components of device 500. As an example, clock generator 516 is depicted as supplying clock signals to processor 504 of device 500. In some embodiments, clock generator 516 may receive one or more Frequency Identification (FID) signals, and may generate the clock signals at an appropriate frequency, based on the FID signals.

In some embodiments, device 500 may comprise a battery 518 supplying power to various components of device 500. As an example, battery 518 is depicted as supplying power to processor 504. Although not depicted in the figures, device 500 may comprise a charging circuitry, e.g., to recharge the battery based on an Alternating Current (AC) power supply received from an AC adapter.

In some embodiments, device 500 may comprise PCU 510a and/or PCU 510b (which may also be referred to as Power Management Units (PMUs), Power Controllers, and so on). In some embodiments, PCU 510a may be implemented by one or more of cores 508a, 508b, and/or 508c, as is symbolically depicted using a dotted box labelled PCU 510a. For some embodiments, PCU 510b may be implemented outside the cores, as is symbolically depicted using a dotted box labelled PCU 510b. PCU 510a and/or PCU 510b may implement various power management operations for device 500. PCU 510a and/or PCU 510b may include hardware interfaces, hardware circuitries, connectors, registers, and so on, as well as software components (e.g., drivers, protocol stacks), to implement various power management operations for device 500. In some embodiments, PCU 510a and/or PCU 510b may comprise an AC loss handling circuitry 330.

In some embodiments, device 500 may comprise PMIC 512, e.g., to implement various power management operations for device 500. In some embodiments, PMIC 512 may be a Reconfigurable Power Management ICs (RPMICs) and/or an IMVP (Intel® Mobile Voltage Positioning). In some embodiments, the PMIC may be within an IC chip separate from processor 504. The may implement various power management operations for device 500. PMIC 512 may include hardware interfaces, hardware circuitries, connectors, registers, and so on, as well as software components (e.g., drivers, protocol stacks), to implement various power management operations for device 500.

For some embodiments, device 500 may comprise PCU 510a, PCU 510b, and/or PMIC 512. In some embodiments, anyone of PCU 510a, PCU 510b, and/or PMIC 512 may be absent in device 500, and hence, these components are depicted using dotted lines.

Various power management operations of device 500 may be performed by PCU 510a, PCU 510b, PMIC 512, or by a combination thereof. For some embodiments, PCU 510a, PCU 510b, and/or PMIC 512 may select a power state (e.g., a P-state) for various components of device 500. In some embodiments, PCU 510a, PCU 510b, and/or PMIC 512 may select a power state for various components of device 500 (e.g., in accordance with the ACPI (Advanced Configuration and Power Interface) specification). In some embodiments, for example, PCU 510a, PCU 510b, and/or PMIC 512 may cause various components of the device 500 to transition to a sleep state, to an active state, to an appropriate C state (e.g., C0 state, or another appropriate C state, in accordance with the ACPI specification), and so on.

For some embodiments, PCU 510a, PCU 510b, and/or PMIC 512 may control a voltage output by voltage regulator 514 and/or a frequency of a clock signal output by the clock generator, e.g., by outputting the VID signals and/or the FID signals, respectively. In some embodiments, PCU 510a, PCU 510b, and/or PMIC 512 may control battery power usage, charging of battery 518, and features related to power saving operation.

Clock generator 516 may comprise a phase locked loop (PLL), frequency locked loop (FLL), or any suitable clock source. In some embodiments, each core of processor 504 may have its own clock source. As such, each core may operate at a frequency independent of the frequency of operation of the other core. In some embodiments, PCU 510a, PCU 510b, and/or PMIC 512 may perform adaptive or dynamic frequency scaling or adjustment. For some embodiments, clock frequency of a processor core may be increased if the core is not operating at its maximum power consumption threshold or limit. In some embodiments, PCU 510a, PCU 510b, and/or PMIC 512 may determine the operating condition of each core of a processor, and may opportunistically adjust frequency and/or power supply voltage of that core without the core clocking source (e.g., a PLL of that core) losing lock when PCU 510a, PCU 510b, and/or PMIC 512 determines that the core is operating below a target performance level. In some embodiments, if a core is drawing current from a power supply rail less than a total current that is allocated for that core (or for processor 504), then PCU 510a, PCU 510b, and/or PMIC 512 may temporarily increase the power draw for that core (or for processor 504), for example, by increasing a clock frequency and/or a power supply voltage level, so that the core or processor 504 can perform at a higher performance level. As such, in various embodiments, voltage and/or frequency may be increased temporarily for processor 504 without violating product reliability.

For some embodiments, PCU 510a, PCU 510b, and/or PMIC 512 may perform power management operations, e.g., based at least in part on receiving measurements from power measurement circuitries 542, temperature measurement circuitries 540, charge level of battery 518, and/or any other appropriate information that may be used for power management. To that end, PMIC 512 may be communicatively coupled to one or more sensors to sense and/or detect various values of and/or variations in one or more factors having an effect on power and/or thermal behavior of the system or platform. Examples of the one or more factors may include electrical current, voltage droop, temperature, operating frequency, operating voltage, power consumption, inter-core communication activity, and so on. Sensors for one or more of these factors may be provided in physical proximity to (and/or in thermal contact with or thermally coupled to) one or more components or logic/IP blocks of a computing system (e.g., a computing system of device 500). Additionally, in some embodiments, sensor(s) may be directly coupled to PCU 510a, PCU 510b, and/or PMIC 512 to allow PCU 510a, PCU 510b, and/or PMIC 512 to manage processor core energy at least in part based on value(s) detected by one or more of the sensors.

Also depicted is an example software stack of device 500 (although not all elements of the software stack are depicted). In various embodiments, processor 504 may execute application programs 550, Operating System (OS) 552, one or more Power Management (PM) specific application programs (e.g., generically referred to as PM applications 558), and/or the like. PM applications 558 may also be executed by PCU 510a, PCU 510b, and/or PMIC 512. OS 552 may also include one or more PM applications 556a, 556b, 556c, and so on. OS 552 may also include various drivers 554a, 554b, 554c, and so on, some of which may be specific for power management purposes. In some embodiments, device 500 may further comprise a Basic Input/Output System (BIOS) 520. BIOS 520 may communicate with OS 552 (e.g., via one or more of drivers 554a, 554b, 554c, and so on), communicate with processor 504, and so on.

In various embodiments, one or more of PM applications 558, drivers that OS 552 includes (e.g., drivers 554a, 554b, 554c, and so on), PM applications that OS 552 includes (e.g., PM applications 556a, 556b, 556c, and so on), BIOS 520, and so on may be used to implement power management specific tasks. For example, these components may be used to control voltage and/or frequency of various components of device 500, to control wake-up state, sleep state, and/or any other appropriate power state of various components of device 500, to control battery power usage, to control a charging of the battery 518, to control features related to power saving operation, and so on.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus comprising: an input to receive an indicator that a supply voltage to a computer system has been interrupted; an output to provide an indicator to reduce a processor power consumption level; and a circuitry to establish the indicator to reduce the processor power level based upon the indicator that the supply voltage to the computer system has been interrupted.

In example 2, the apparatus of example 1, wherein the supply voltage is an AC voltage.

In example 3, the apparatus of any of examples 1 through 2, wherein the indicator that the supply voltage to the computer system has been interrupted includes an AC loss message.

In example 4, the apparatus of any of examples 1 through 3, wherein the indicator that the supply voltage to the computer system has been interrupted includes an indicator that the supply voltage has fallen to a no-voltage level.

In example 5, the apparatus of any of examples 1 through 4, wherein the indicator to reduce the processor power consumption level includes an indicator to throttle a processor frequency.

In example 6, the apparatus of any of examples 1 through 5, wherein the indicator to reduce the processor power consumption level includes an indicator to flush at least a portion of the contents of a first memory to a second memory.

In example 7, the apparatus of example 6, wherein the first memory is a persistent memory.

In example 8, the apparatus of any of examples 1 through 7, wherein the supply voltage corresponds with a power of a first magnitude; wherein a UPS is to supply a voltage that has a power of the first magnitude to the computer system for a predetermined length of time subsequent to the indicator that the supply voltage to the computer system has been interrupted; and wherein the UPS is to supply a voltage that has a power of a second magnitude to the computer system subsequent to the predetermined length of time, and the first magnitude is greater than the second magnitude.

In example 9, the apparatus of example 8, wherein the first magnitude is at least forty percent greater than the second magnitude.

In example 10, the apparatus of any of examples 8 through 9, wherein the predetermined length of time is less than or equal to 20 milliseconds.

Example 11 provides an apparatus comprising: an input to receive a first indicator that an AC voltage supplied to a system has stopped; an output to provide a second indicator to flush at least a portion of the contents of a first memory to a second memory; a circuitry to establish the second indicator based upon the first indicator.

In example 12, the apparatus of example 11, wherein the first indicator includes an AC loss message.

In example 13, the apparatus of any of examples 11 through 12, wherein the second indicator includes at least one of: an indicator to reduce a processor power consumption level, or an indicator to throttle a processor frequency.

In example 14, the apparatus of any of examples 11 through 13, wherein the first memory is a persistent memory.

In example 15, the apparatus of any of examples 11 through 14, wherein the AC voltage supplied to the system corresponds with a power of a first magnitude; wherein a UPS is to supply a voltage that has a power of the first magnitude to the system for a predetermined length of time subsequent to the indicator that the supply voltage to the system has been interrupted; and wherein the UPS is to supply a voltage that has a power of a second magnitude to the system subsequent to the predetermined length of time, and the first magnitude is greater than the second magnitude.

In example 16, the apparatus of example 15, wherein the first magnitude is at least forty percent greater than the second magnitude.

In example 17, the apparatus of any of examples 15 through 16, wherein the predetermined length of time is less than or equal to 20 milliseconds.

Example 18 provides a system comprising a memory, a processor coupled to the memory, a UPS, a wireless interface to allow the processor to communicate with another device, and a component including: an input to receive an indicator that an AC voltage supplied to the system has been interrupted; an output to provide, to the processor, an indicator to reduce a processor power consumption level; and a circuitry to establish the indicator to reduce the processor power level based upon the indicator that the AC voltage supplied to the system has been interrupted.

In example 19, the system of example 18, wherein the indicator that the supply voltage to the system has been interrupted includes at least one of: an AC loss message, or an indicator that the supply voltage has fallen to a no-voltage level; wherein the indicator to reduce the processor power consumption level includes at least one of: an indicator to throttle a processor frequency, or an indicator to flush at least a portion of the contents of the memory to an additional memory; and wherein the first memory is a persistent memory.

In example 20, the system of any of examples 18 through 19, wherein the AC voltage supplied to the system corresponds with a power of a first magnitude; wherein a UPS is to supply a voltage that has a power of the first magnitude to the system for a predetermined length of time subsequent to the indicator that the supply voltage to the system has been interrupted; wherein the UPS is to supply a voltage that has a power of a second magnitude to the system subsequent to the predetermined length of time; and wherein the first magnitude is at least forty percent greater than the second magnitude.

Example 21 provides a method comprising: receiving an indicator that a supply voltage to a computer system has been interrupted; providing an indicator to reduce a processor power consumption level; establishing the indicator to reduce the processor power level based upon the indicator that the supply voltage to the computer system has been interrupted.

In example 22, the method of example 21, wherein the supply voltage is an AC voltage; wherein the indicator that the supply voltage to the computer system has been interrupted includes an AC loss message; and wherein the indicator that the supply voltage to the computer system has been interrupted includes an indicator that the supply voltage has fallen to a no-voltage level.

In example 23, the method of any of examples 21 through 22, wherein the indicator to reduce the processor power consumption level includes an indicator to throttle a processor frequency; wherein the indicator to reduce the processor power consumption level includes an indicator to flush at least a portion of the contents of a first memory to a second memory; and wherein the first memory is a persistent memory.

In example 24, the method of any of examples 21 through 23, wherein the supply voltage corresponds with a power of a first magnitude; wherein a UPS is to supply a voltage that has a power of the first magnitude to the computer system for a predetermined length of time subsequent to the indicator that the supply voltage to the computer system has been interrupted; wherein the UPS is to supply a voltage that has a power of a second magnitude to the computer system subsequent to the predetermined length of time, and the first magnitude is greater than the second magnitude; wherein the first magnitude is at least forty percent greater than the second magnitude; and wherein the predetermined length of time is less than or equal to 20 milliseconds.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An uninterruptible power supply, comprising:
   a memory to store instructions; and
   a processor to execute the instructions to:
   pass alternating current (AC) power from an AC power supply to a computer system;
   detect a power loss in the AC power supply; and
   in response to the detecting of the power loss, provide a signal to the computer system indicating the power loss and provide AC power based on a battery to the computer system,
   wherein to provide the AC power based on the battery to the computer system, the uninterruptible power supply is to provide an AC power which is greater than a rated continuous maximum power of the uninterruptible power supply for a window of time,
   wherein a processor of the computer system is to flush at least a portion of contents of a volatile memory to a non-volatile memory during the window of time and in response to the signal while the uninterruptible power supply is providing the AC power in excess of its rated continuous maximum power.

2. The uninterruptible power supply of claim 1, wherein the window of time is at least as long as a single cycle of the AC power supply.

3. The uninterruptible power supply of claim 1, wherein the signal provided to the computer system comprises a Universal Serial Bus (USB) message.

4. The uninterruptible power supply of claim 1, wherein the processor is to throttle a frequency of the processor during the window of time and in response to the signal while the uninterruptible power supply is providing the AC power in excess of its rated continuous maximum power.

5. The uninterruptible power supply of claim 1, wherein the first volatile memory is a persistent memory.

6. The uninterruptible power supply of claim 1, wherein the processor is to execute the instructions to provide the AC power based on the battery to the computer system subsequent to the window of time at a power level which is less than or equal to the rated continuous maximum power.

7. The uninterruptible power supply of claim 1, wherein the uninterruptible power supply is temporarily overloaded by at least forty percent during the window of time.

8. The uninterruptible power supply of claim 1, wherein the window of time is less than or equal to 20 milliseconds.

9. The uninterruptible power supply of claim 1, wherein the processor is to execute the instructions to provide a Human Interface Device (HID) driver to provide the signal to the computer system.

10. The uninterruptible power supply of claim 1, wherein the uninterruptible power supply is temporarily overloaded during the window of time at 125% to 150% of the rated continuous maximum power.

11. The uninterruptible power supply of claim 1, wherein the AC power based on the battery matches a power supply rating of a power supply unit in the computer system.

12. A computer system, comprising:
    a power supply unit (PSU);
    a volatile memory and a non-volatile memory to be powered by the PSU; and a processor to be powered by the PSU; wherein:
the PSU is to be:
powered by an alternating current (AC) power supply at a power supply rating of the PSU;
subsequently powered by an AC power based on a battery of an uninterruptible power supply (UPS) at the power supply rating of the PSU during a window of time following an interruption in the AC power supply, wherein the UPS is temporarily overloaded relative to a rated continuous maximum power of the UPS to provide the AC power at the power supply rating of the PSU; and
powered by the AC power based on the battery of the UPS at a power level which is less than or equal to the rated continuous maximum power of the UPS, subsequent to the window of time; and
the processor is to receive a signal from the UPS indicating the interruption in the AC power supply and, in response to the signal, to flush at least a portion of contents of the volatile memory to the non-volatile memory and to throttle a frequency of the processor during the window of time while the UPS is temporarily overloaded.

13. The computer system of claim 12, further comprising a Universal Serial Bus (USB) interface to receive the signal indicating the interruption loss in the AC power supply from a Human Interface Device (HID) driver of the UPS.

14. The computer system of claim 12, wherein the window of time is a predetermined length of time in which the UPS is temporarily overloaded.

15. The computer system of claim 14, wherein the UPS is temporarily overloaded relative to the rated continuous maximum power of the UPS by at least forty percent.

16. The computer system of claim 14, wherein the UPS is temporarily overloaded for at least 20 milliseconds.

17. A system comprising:
an Uninterruptible Power Supply (UPS); and
a computer system comprising an interface, a processor, a power supply unit (PSU), a volatile memory and a non-volatile memory; wherein:
the UPS is to detect that an Alternating Current (AC) power supplied to the computer system has been interrupted and, in response to the detection, operate in an overload condition relative to a rated continuous maximum power of the UPS in a window of time, the overload condition is to supply AC power to the computer system based on a battery at a power level which matches a power supply rating of the PSU, the UPS is further to provide a signal to the interface indicating the AC power supplied to the computer system has been interrupted; and
the processor, in response to receiving the signal from the interface, is to flush data from the volatile memory to the non-volatile memory during the window of time while the UPS operates in the overload condition.

18. The system of claim 17, wherein the processor, in response to receiving the signal from the interface, is to throttle a frequency of the processor after the flushing of the data.

19. The system of claim 17, wherein the UPS is to supply AC power to the computer system based on the battery at a power level which is less than or equal to the rated continuous maximum power of the UPS subsequent to the window of time.

* * * * *